United States Patent [19]

Reeves

[11] Patent Number: 5,697,408
[45] Date of Patent: Dec. 16, 1997

[54] FILLING CONTAINERS

[76] Inventor: Leslie Neville Reeves, 17 Links Road, Romiley, Stockport (Chesire), England, SK6 4HN

[21] Appl. No.: 586,656
[22] PCT Filed: Apr. 25, 1995
[86] PCT No.: PCT/GB95/00942
  § 371 Date: Jul. 19, 1996
  § 102(e) Date: Jul. 19, 1996
[87] PCT Pub. No.: WO95/29864
  PCT Pub. Date: Nov. 9, 1995

[30] Foreign Application Priority Data

Apr. 30, 1994 [GB] United Kingdom ............... 9408657
Jul. 13, 1994 [GB] United Kingdom ............... 9414158

[51] Int. Cl.⁶ ................................. B65G 69/18
[52] U.S. Cl. ............... 141/284; 141/96; 141/256; 141/264; 193/30; 414/295
[58] Field of Search ............... 141/1, 96, 255, 141/256, 263, 264, 284; 414/295, 397; 193/30

[56] References Cited

U.S. PATENT DOCUMENTS

| | | | |
|---|---|---|---|
| 1,021,757 | 4/1912 | Blaisdell | 193/30 |
| 3,241,581 | 3/1966 | Richardson et al. | 141/284 X |
| 3,738,464 | 6/1973 | Ortlip et al. | 193/25 C |
| 3,858,733 | 1/1975 | Morioka et al. | 414/291 |
| 4,194,615 | 3/1980 | Tell | 198/502 |
| 5,016,686 | 5/1991 | Gerstenkorn | 141/96 |
| 5,190,132 | 3/1993 | Stanelle et al. | 193/30 |
| 5,372,229 | 12/1994 | Leibling | 193/30 X |

FOREIGN PATENT DOCUMENTS

| | | |
|---|---|---|
| 2821210 | 11/1979 | Germany . |
| 3838541 | 5/1990 | Germany . |
| 9319205 | 3/1994 | Germany . |

Primary Examiner—J. Casimer Jacyna
Attorney, Agent, or Firm—Collard & Roe, P.C.

[57] ABSTRACT

A container filling apparatus comprising a filling chute in the form of an extendable and retractable telescopic tube for extending downwardly into a container. The tube has a closure device for closing the otherwise open lower end of the tube and a cable device to lower the tube as it extends downwardly into the container. A filling device is provided to supply material into the upper end of the tube as it is lowered, as well as device for sensing contact with the floor of the container. There is an operating device to open the closure device in response to a signal from the device for sensing the floor of the container. There is also a probe mounted at the bottom of the tube to sense the proximity of the bottom of a container and/or the level of material in the container. A second probe is mounted at the top of the tube to sense when the tube has been filled to the level of the probe and to temporarily interrupt the feed of material to the tube. There is also a device to operate the cable device to gradually withdraw the tube while the filling device continues to supply material to the tube, such that no free fall of material occurs within or on leaving the tube.

10 Claims, 5 Drawing Sheets

FILLING CONTAINERS

BACKGROUND OF THE INVENTION

1. Field of the Invention

This invention relates to a container filling apparatus and methods for filling containers such as tanks, hoppers, or bins, for example, with damageable particulate materials.

2. The Prior Art

In the normal handling for example of foodstuffs or ingredients for foodstuffs, the material being handled is capable of being easily damaged by pressure, abrasion or concussion taking place in the normal operation of material transporting and filling and emptying of containers. The damage incurred to such materials, for example, shaped cereal products, nuts, etc., give rise to rejection and waste of significant proportion of the product, since, for example, broken and pulverized shaped cereal bubbles are not a saleable product.

One operation which can damage such products is the initial phase of filling a container with the product by gravity, since the product usually initially falls from an inlet in the top of the container, under gravity impact on the floor of the container. As the container fills, the effect is reduced as the fall distance is reduced, and the impact of the material is cushioned by the material already lying on the floor of the container. Nevertheless, this form of product damage is a significant source of loss and waste.

No effective or satisfactory solution to this problem has been devised so far, even though there is a need for some means of avoiding damage to and consequent waste of such food products.

SUMMARY OF THE INVENTION

It is therefore an object of the present invention to provide an apparatus for filling containers which is capable of reducing and minimizing the damage to products of the kind mentioned, in filling containers such as tanks, bins or hoppers by gravity feed.

According to this invention, the container filling apparatus comprises a filling chute which consists of an extensible and retractable tube, means for closing an otherwise open lower end of the tube, means for extending the tube by stages downwardly into a container, and filling means for supplying material to the tube as it is lowered. The invention further comprises means operative to open the closure means when the lower end of the tube is adjacent the floor of a container, to allow egress of material from the tube, and means for gradually thereafter withdrawing the tube while the filling means continues to supply material through the tube to fill the container.

The invention also provides a method of filling a container with damageable fluent material, comprising lowering an extendable tube by stages into the container from above; feeding material into the tube as it is extended to take up additional volume in the tube, sensing when the lower end of the tube is adjacent to or resting on the floor of the container, and opening a closure in the lower end of the tube to allow material to flow from the end of the tube into the container. The method further comprises withdrawing the tube by stages while continuing to supply material through the tube to the container and allowing the container to fill in step with withdrawal of the tube.

Preferably, the tube is in the form of a telescopic tube, comprised of a plurality of relatively slidable sections, the widest and outermost of which sections provide the lowermost section of the tube. The successive sections of the tube thus become narrower towards the top of the extended tube. This arrangement avoids dust and particle traps in the tube.

Alternatively, the tube could be a flexible tube, which is disposed in loops or curves, which are paid out by lowering the end of the tube. The tube could also be a bellows or other foldable construction, in which case care would have to be taken to avoid accumulation of dust and particles in the folds.

The closure at the lower end of the tube is preferable a conical bell, with some form of edge seal to the bottom edge of the tube, but other constructions, such as a slide, or flap valve, or a sleeve surrounding the lower end of the tube which can be raised to expose a plurality of apertures at the bottom of the tube, are possible.

A probe may be provided at the top of the tube, to sense at each stage when the tube has been filled to each level, to temporarily interrupt the feed of material to the tube.

There may also be a probe provided at the top of the tube, to sense at each stage when the tube has been filled to each level, to temporarily interrupt the feed of material to the tube.

There may also be a probe provided at the bottom of the tube to sense the presence of material remaining in the container, if the material has been incompletely discharged, and/or sense the proximity of the bottom of the container.

The tube may be extended and retracted, by lines connected to appropriate parts of the tube and arranged to be paid out from reels disposed to be driven in both the wind-out (extension) and wind-up (retraction) senses, by a pair of matched motors driving spools for the lines. The lines may nylon or similar threads of the kind sold as fishing lines.

Contact or proximity with the floor may be detected by a load cell which detects the change of load (ie reduction of the load) exerted at the lower end of the tube on achieving floor contact.

In accordance with a further embodiment of the invention, each cable may be provided with a respective take-up drum, and these drums may be driven by a common drive. Dropping of the bell relative to the end of the chute is accomplished by a variable loop in the cable connected to the bell, whereby the loop may be extended to press the bell closed against the chute end, and shortened to allow the bell to fall away from the chute end, to thereby open the chute.

This apparatus has features of simplicity, since it is only necessary to control the winch drive.

The variable loop may be a displaceable pulley over which the cable is reeved. The pulley may be arranged to be moved by a pneumatic or hydraulic cylinder, or a solenoid armature, for example.

In a further embodiment of the invention, the lowest sections of the chute may contain a helical worm disposed vertically so that material descending the chute can be retarded before reaching the cone, thereby limiting impact damage to the material.

BRIEF DESCRIPTION OF THE DRAWINGS

A preferred embodiment and method according to the invention will now be described, with reference to the accompanying drawings wherein.

DETAILED DESCRIPTION OF THE PREFERRED EMBODIMENT

Figure 1:
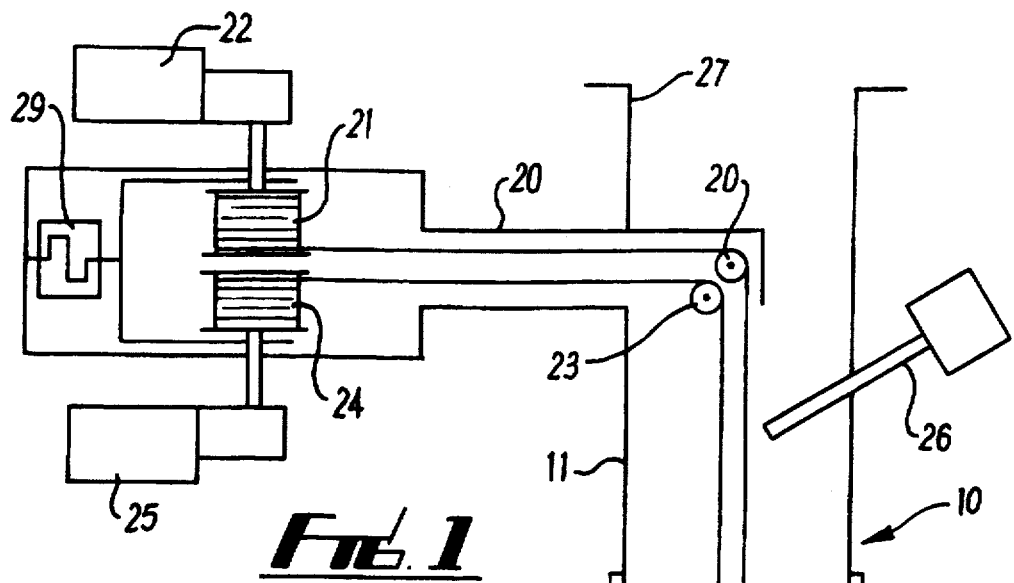
FIG. 1 is a sectional view of an (extended) container filling apparatus according to the invention.

Referring first to FIG. 1, the container filling apparatus according to the invention comprises a tube 10 composed of an upper section 11, and three telescopic lower sections 12, 13 and 14, each lower section being wider than and slidable outside of the next higher section. The lowest (and widest) section 14 is closed by a conical weighted bell 16, which can be disengaged from a seal 17 at the bottom rim of section 14.

The lowest section 14 is suspended from a line 18, connected by a spider-bracket 19 to the lowest section, and passing over a pulley 20 within the upper section 11, through a side duct 20 to a pulley reel 21, driven by an electric motor 22 via suitable gearing.

The bell 15 is connected, via a line 15, over a pulley 23 adjacent pulley 20, to a pulley reel 24 which is driven by an electric motor 25 via suitable gearing.

A probe 26 is located towards the top of upper section 11, to sense the load of material in the tube. When the material reaches the probe, the feed of material through top end 27 of the tube is interrupted until the material recedes (e.g., by further extension of the tube).

A further probe 28 is located in the lowest section 14, protruding beyond bell 16, to detect the presence of material below bell 16, such as undischarged material in a container. Probe 28 is connected to stop lowering of the tube should any such obstruction be encountered.

A load cell 29 detects any change in the pull exerted by the bell, which normally has only its own weight acting on it. When the tube and bell are hanging freely, the tube is suspended by line 18, which is lowering it, and bell 16 by line 15. When the bell reaches the floor, the end of the tube rests briefly on bell 16, and this change in weight condition is sensed by load cell 29 to stop the lowering drive.

FIGS. 2 to 10 are a sequence illustrating the filling of a bin or hopper 30, by the apparatus and method of the invention.

Figure 2:
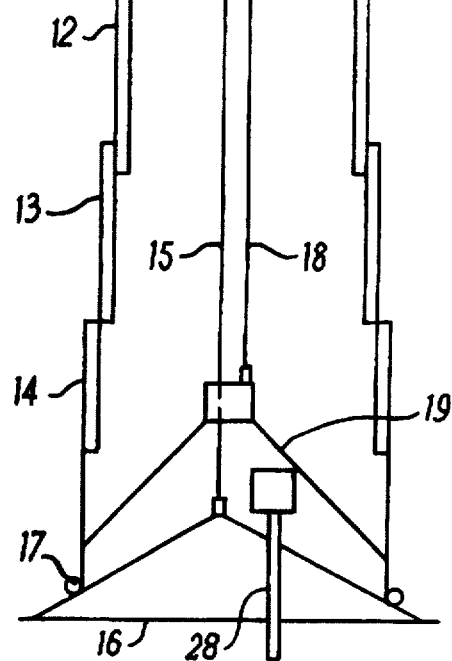
FIG. 2 shows the apparatus out of use.

FIG. 2 shows the apparatus out of use, with tube 10 fully retracted.

Figure 3:
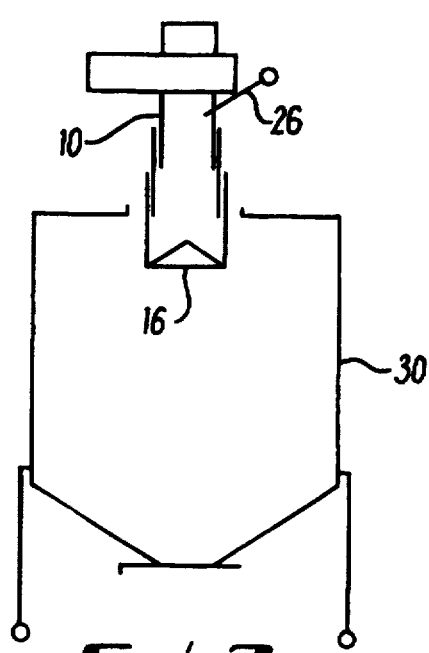
FIGS. 3 to 10 show the successive stages of the filling process.

FIG. 3 shows a bin 30 introduced below the apparatus, and tube 10 now partially extended.

Figure 4:
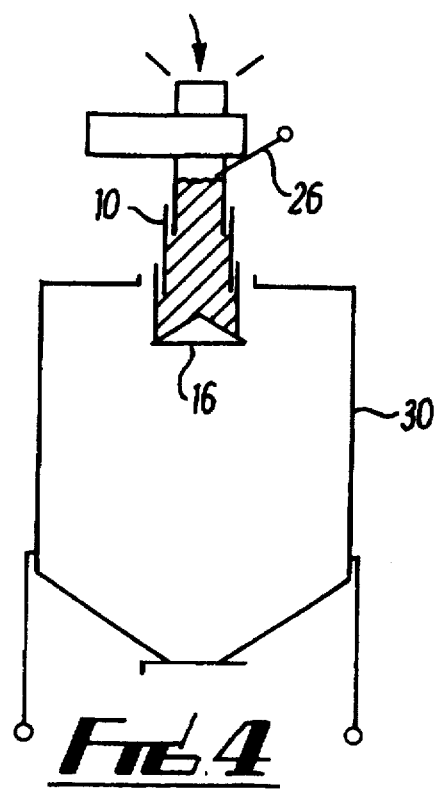

FIG. 4 shows the partially extended tube now filled with material, until the material is sensed by probe 26.

Figure 5:
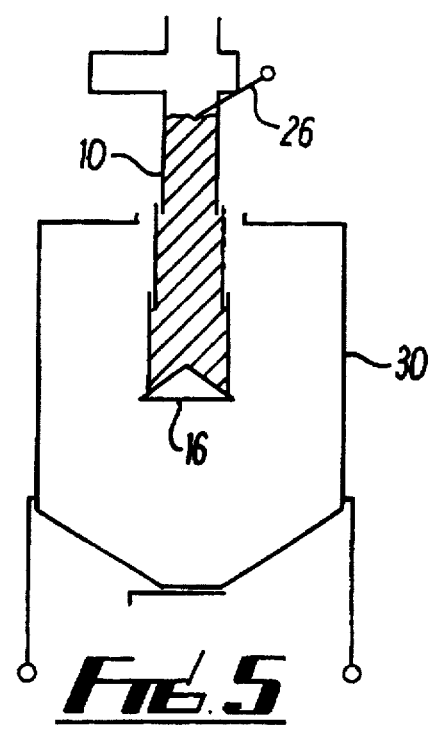
Figure 6:
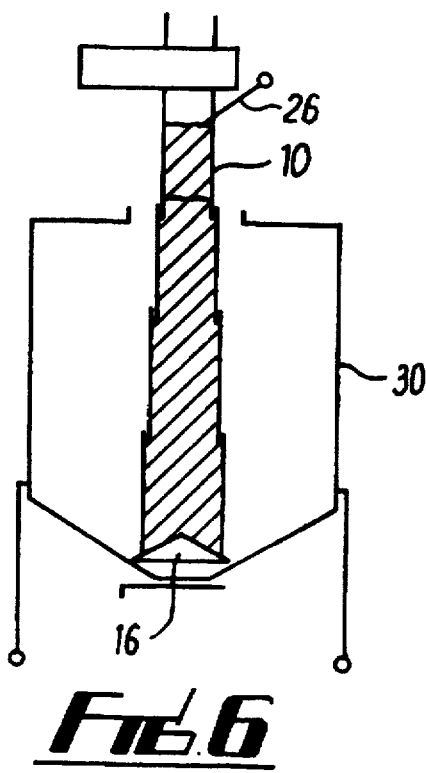

FIG. 5 shows the tube further extended, and FIG. 6 shows the tube finally extended to the floor of the bin.

Figure 7:
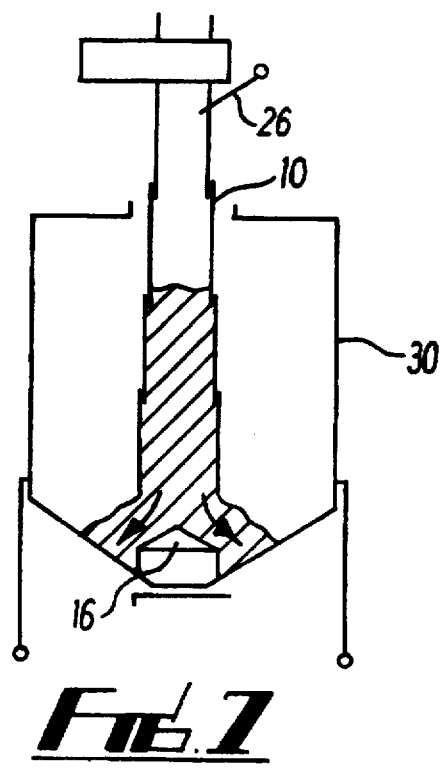
Figure 8:
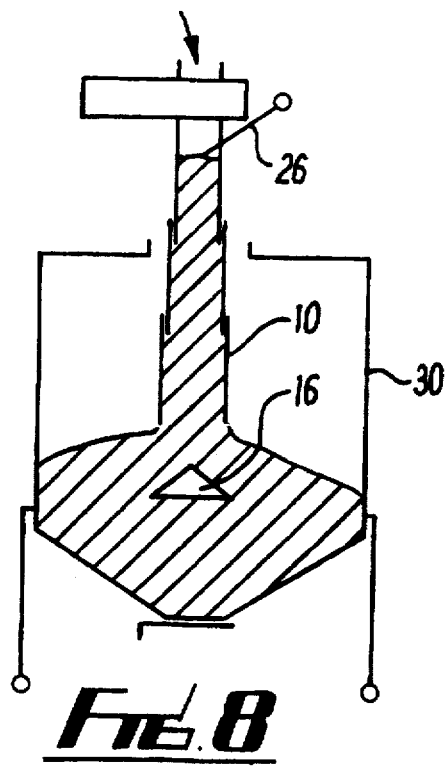
Figure 9:
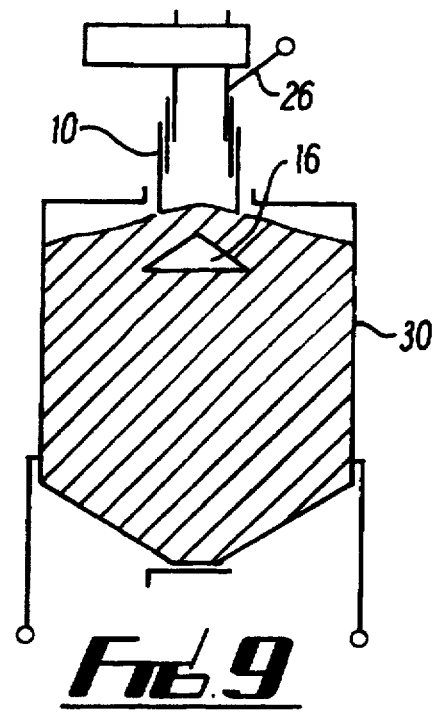
Figure 10:
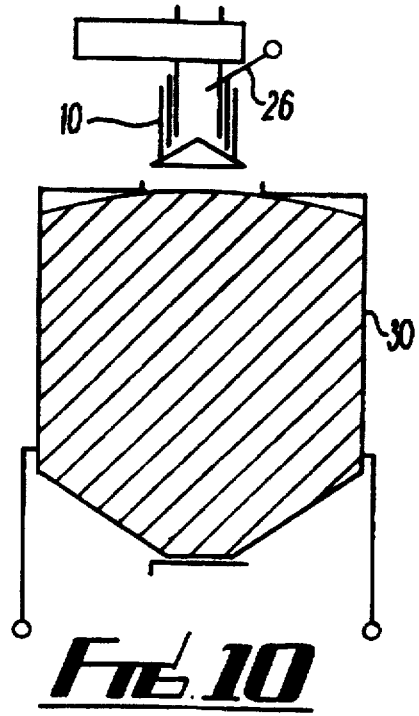

In FIG. 6, bell 16 is disengaged from the lowest section 14, and in FIG. 7 the tube is slightly retracted. In FIGS. 8 and 9, the tube is further retracted, followed by bell 16 with a gap maintained between the end of the tube and the bell. Finally in FIG. 10, the bin is filled and the tube and ball returned to the fully retracted position of FIG. 2.

Figure 11:
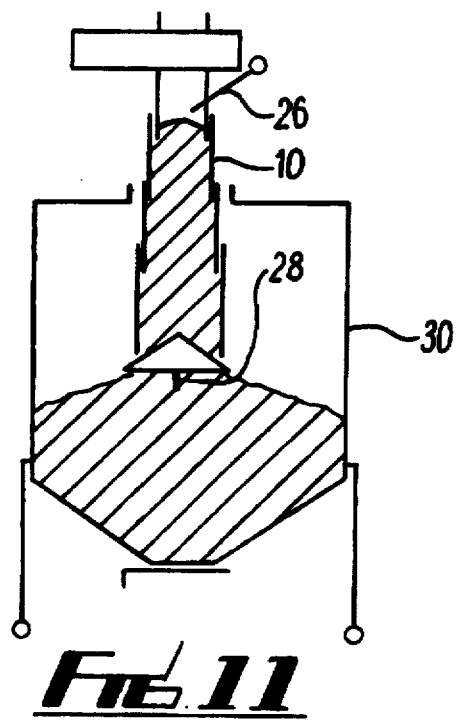
FIG. 11 shows feed into an already partially filled container.

FIG. 11 shows what happens when a container unwittingly returned still partially filled. When the tube is lowered, probe 28 senses the presence of material in the container, and causes by-passing of further lowering of the tube. Instead, retraction of the tube is initiated, and material is allowed to enter the container above the material already there. The tube and bell are gradually retracted, as before, until the bin is full, and the apparatus fully retracted.

Figure 12:
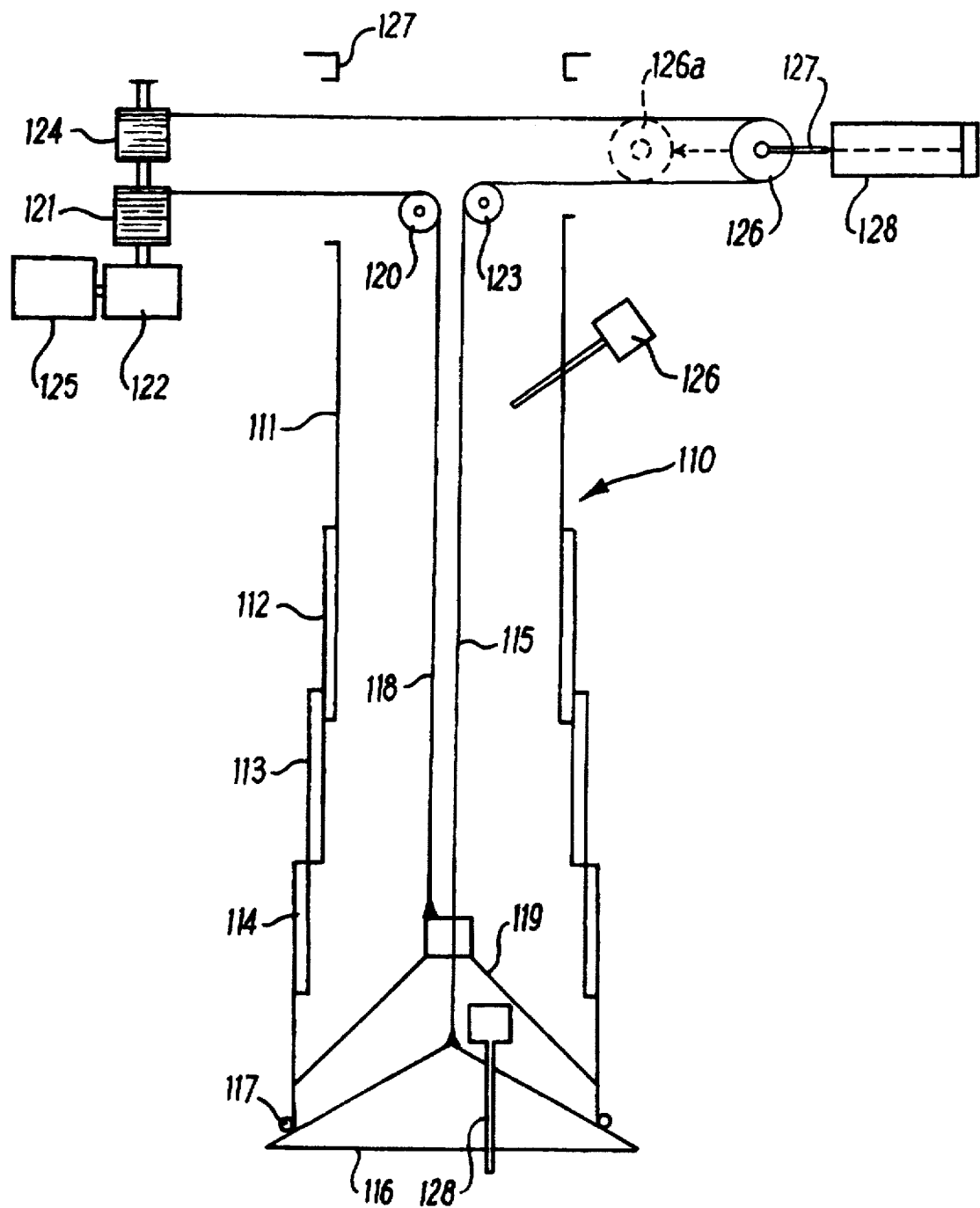
FIG. 12 is a view similar to FIG. 1, of a second embodiment of the apparatus according to the invention.

In FIG. 12, a second embodiment of apparatus 110 comprises an upper section 111, and three telescopic lower sections 112, 113 and 114, each lower section being wider than, and slidable outside of, the next higher section. The lowest and widest section 114 is closed by a conical weighted bell 116, which can be disengaged from a seal 117 at the bottom rim of section 115.

The lowest section 114 is suspended from cable 118, connected by a spider bracket 119 to the lowest section, and passing over a pulley 120 in the upper section 111, to a pulley reel 121 driven by an electric motor 125 through a gearing 122.

Bell 116 is connected by a cable 115 over a pulley 123, to a pulley 126, mounted on a piston 127 of a hydraulic or pneumatic cylinder 128. Cable 115 then returns across the chute 110 to a reel 124, mounted on a common drive shaft, from gearing 122, and motor 125 with the reel 121 to be driven in unison therewith.

Pulley 126 forms a variable length loop in cable 115, which can be extended or shortened by operation of cylinder 128, so that bell 116 can be dropped relative to the lower end of the chute, or pulled up firmly against seal 117.

In extending the chute, cables 118 and 115 are operated together, lowering the chute and bell at the same rate. Piston 127 is retracted to pull the bell firmly against the seal. The device operates as described in my earlier application until the chute is fully extended. Retraction of the chute now begins, and piston 127 is extended, moving pulley 126 to, e.g., position 126a, and shortening the loop in cable 115, thereby allowing bell 116 to fall away from the end of the chute. When the desired gap has been created, the piston ceases extending, and the bell is pulled up in step with the chute, maintaining the desired gap. When retracted, piston 126 may be retracted into cylinder 128, to pull bell 116 back into contact with seal 117, to recommence the cycle.

Figure 13:
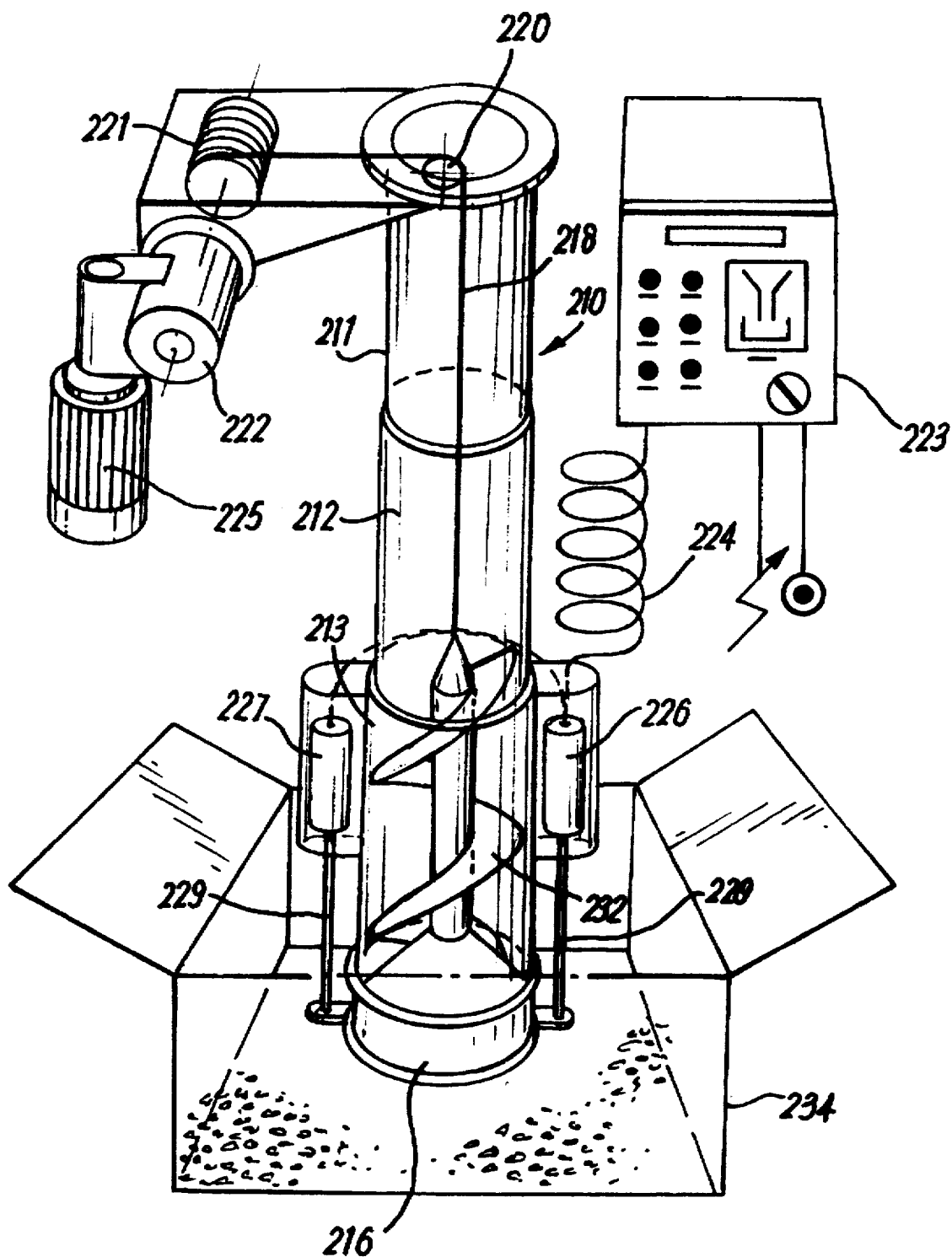
FIG. 13 is a similar view of the third embodiment of such apparatus.

FIG. 13 illustrates, in a diagrammatic perspective view, a third embodiment of the invention. This is shown for filling containers such as a carton 234 with a confectionery product with a greater density than the cereal products intended to be handled by the first two embodiments.

In this embodiment, a telescopic chute 210 comprises three sections, 211, 212 and 213, the lower sections each being wider than the immediately higher sections. The lower end of lowest section 213 is arranged to be closed by a conical bell 216, which has a central column 230 extending up from its apex, axially over a central column 230 extending up from its apex, axially of section 213, and connected to a line 218, reeved over pulley 220, to be wound up and played out from a drum 221. This drum 221 is driven by a motor 225 via a reduction gear 222.

The column 230 carries a helical pin 232 which forms a slide within lowest section 213 of chute 210. Instead of a second line, such as 15 in FIG. 1 or 115 in FIG. 12 attached to bell 216, bell 216 is instead arranged to be actuated by a pair of pneumatic cylinders 226 and 227 carried on the outside of section 213, which are connected to bell 216 by plungers 228 and 229. Cylinders 226 and 227 are controlled via air line 224 by a control apparatus 223, which keeps bell 216 closed against the bottom rim of section 213, until strain gauges sense that chute 210 has been extended to reach the floor of carton 234. As the chute is subsequently retracted, plungers 228 and 229 are gradually extended until a sufficient gap is opened between the bell and the rim of the chute. The cylinders are then operated to close the gap, when it is sensed by weight or level sensors that carton 234 has been filled.

The method and apparatus of the invention are of particular use in the food industry, where fragile materials, which in bulk act as particulate fluent materials, are routinely handled by filling and discharging transfer containers such as hoppers, bins and tanks. The invention avoids the initial drop of material into a container, impacting on the container floor which causes damage to the produce by impact and abrasion, and thereby rejection of product and consequent waste will be reduced.

Examples of products with which the invention may be used are shaped or bubbled cereal products, nuts, and mini-biscuits and confectionery products, all of which would be impaired as saleable products by breakage of abrasion.

Accordingly, while only several embodiments of the present invention have been shown and described, it is obvious that many changes and modifications may be made thereunto without departing from the spirit and scope of the invention.

What is claimed is:

1. A method of filling a container with damageable fluent material, comprising;
    lowering an extensible and retractable telescopic tube into the container from above with a cable;
    feeding material into said tube as the tube is extended to keep the tube substantially completely filled as it is lowered to take up additional volume in the tube;
    sensing when the lower end of the tube is adjacent to or resting on a floor of the container;
    opening a closure in the lower end of the tube to allow material to flow from the end of the tube whilst continuing to supply material through the tube to the container,
    allowing the container to fill in step with withdrawal of the tube with said cable while maintaining the tube substantially completely filled,
    wherein the withdrawal of said tube is controlled by a probe means mounted at the bottom of the tube to sense the proximity of the bottom of the container and subsequent level of material in the container and wherein the maintenance of the tube in a substantially completely filled state is controlled by a second probe means mounted at the top of the tube, said probe means sensing when the tube has been filled to the level of said probe and temporarily interrupting the feed of material to the tube, such that no free fall of the material occurs within or on leaving the tube.

2. A container filling apparatus comprising:
    a filling chute in the form of an extendable and retractable telescopic tube for extending downwardly into a container, said tube having an upper end and a lower end;
    closure means for closing the otherwise open lower end of said tube;
    cable means to lower the tube as it extends downwardly into the container;
    filling means to supply material into the upper end of the tube as the tube is lowered;
    means for sensing contact with the floor of a container;
    operating means to open said closure means in response to the means for sensing contact with the floor of a container;
    probe means mounted at the bottom of the tube to sense the proximity of the bottom of a container and/or the level of material in the container;
    means to operate said cable means to gradually withdraw the tube while said filling means continues to supply material through the tube and;
    a second probe means mounted at the top of the tube, to sense when the tube has been filled to the level of said second probe and to temporarily interrupt the feed of material to the tube,
    wherein said tube can be lowered to the floor of said container, said closure means then being opened and said tube gradually withdrawn from said container, keeping pace with the level of material entering from said tube, such that substantially no free fall of the material occurs within or on leaving the tube.

3. Apparatus according to claim 2, wherein said tube is in the form of a telescopic tube, comprised of a plurality of relatively extensible sections, the widest and outermost of said sections providing the lowermost section of the tube, successive sections of the tube being narrower towards the top of the extended tube.

4. Apparatus according to claim 2 or 3 wherein said closure means at the lower end of said tube is a conical bell, with sealing means sealing to the bottom edge of said tube.

5. Apparatus according to claim 2, wherein the tube is operated, to be extended and retracted, by lines connected to appropriate parts of the tube and arranged to be pair out from reels disposed to be driven, in both the wind-out (extension) and wind-up (retraction) senses by a paid of matched motors driving spools for the lines.

6. Apparatus according to claim 5 wherein each cable is provided with a respective take-up drum, and these drums are driven by a common drive, dropping of the closure means being accomplished by means providing a variable loop in the cable connected to the closure means, whereby the loop may be extended to press the closure means closed against the end of the chute, or shortened to allow the bell to pull away from the chute end, to thereby open the chute.

7. Apparatus according to claim 6, wherein the variable loop is provided by a displaceable pulley over which the cable is reeved, and the pulley is arranged to be moved by a fluid pressure operated device.

8. Apparatus according to claim 2, wherein said means for opening said closure means comprises a pair of fluid pressure operated devices mounted on said tube.

9. Apparatus according to claim 8, wherein said closure means carries, within said tube, a helical slide which acts to retard the descent of material towards the closure means.

10. Apparatus according to claim 2, wherein said means for sensing contact with the container floor comprises a load cell connected to said cable means, said load cell adapted to detect the change of load exerted on the cable means when the lower end of the tube contacts the container floor.

* * * * *